United States Patent [19]

Kobayashi

[11] Patent Number: 5,113,807
[45] Date of Patent: May 19, 1992

[54] COOLING SYSTEM FOR ENGINE

[75] Inventor: Manabu Kobayashi, Shizuoka, Japan

[73] Assignee: Yamaha Hatsudoki Kabushiki Kaisha, Shizuoka, Japan

[21] Appl. No.: 554,256

[22] Filed: Jul. 17, 1990

[30] Foreign Application Priority Data

Jul. 19, 1989 [JP] Japan .................................. 1-186614
Jul. 19, 1989 [JP] Japan .................................. 1-186616

[51] Int. Cl.⁵ .............................................. F02B 75/18
[52] U.S. Cl. .............................. 123/41.74; 123/41.44; 123/90.31; 123/198 C
[58] Field of Search .......... 123/41.08, 41.09, 41.10, 123/41.44, 41.72, 41.74, 41.82 R, 90.27, 90.31, 195 A, 198 R, 198 C

[56] References Cited

U.S. PATENT DOCUMENTS

| | | | |
|---|---|---|---|
| 1,877,051 | 9/1932 | Read | 123/41.82 |
| 3,486,488 | 12/1969 | Frings | 123/41.15 |
| 4,147,139 | 4/1979 | Hass | 123/41.1 |
| 4,284,037 | 8/1981 | Kasting et al. | 123/41.82 R |
| 4,554,893 | 11/1985 | Vecellio | 123/41.74 |
| 4,662,320 | 5/1987 | Moriya | 123/41.44 |
| 4,750,455 | 6/1988 | Ebeso | 123/90.27 |
| 4,756,280 | 7/1988 | Kawasaki | 123/41.47 |
| 4,759,317 | 7/1988 | Ampferer | 123/41.84 |
| 4,889,079 | 12/1989 | Takeda et al. | 123/41.82 R |

FOREIGN PATENT DOCUMENTS

| | | | |
|---|---|---|---|
| 96546 | 3/1973 | Fed. Rep. of Germany . | |
| 3510148 | 6/1986 | Fed. Rep. of Germany | 123/198 C |
| 3807458 | 9/1988 | Fed. Rep. of Germany | 180/297 |
| 2225628 | 11/1974 | France . | |
| 2390885 | 12/1978 | France . | |
| 2143584 | 2/1985 | United Kingdom . | |

Primary Examiner—Noah P. Kamen
Attorney, Agent, or Firm—Ernest A. Beutler

[57] ABSTRACT

A transversely disposed water cooled internal combustion engine for a motor vehicle that cooperates with a heat exchanger that is disposed transversely to the engine compartment and in parallel relationship with the engine. A cooling pump and thermostat assembly is mounted on the side of the engine between its ends and facing the heat exchanger for communicating the heat exchanger with the engine cooling jacket. Coolant is delivered first to the cylinder head and then through the cylinder head to the cylinder block cooling jacket. The coolant pump is driven off to an intermediate shaft driven by the timing mechanism for driving the camshafts of the engine.

46 Claims, 15 Drawing Sheets

COOLING SYSTEM FOR ENGINE

BACKGROUND OF THE INVENTION

This invention relates to a cooling system for an engine and more particularly to an improved cooling system of the type wherein the cylinders of the engine are parallel with the associated heat exchanger for the engine.

In many types of motor vehicles, the engine is placed transversely in the engine compartment and closely adjacent the axles which it drives. Normally this means that the cylinders are parallel with the associated heat exchanger which may be positioned either ahead of or to the rear of the engine within the engine compartment. Conventionally engines are provided with a cooling system wherein water is introduced to the engine at one end of the engine and discharged from the opposite end of the engine. This tends to give rise to uneven temperatures in the engine from one end to the other. That is, the cylinders disposed closer to the water inlet will operate at a lower temperature than those disposed remotely from the water inlet and adjacent the water outlet. Also, in conjunction with transverse placement of the engine, there are certain difficulties in connection with transferring the coolant between the engine and the heat exchanger.

It is, therefore, a principal object of this invention to provide an improved cooling system for an engine wherein the temperature of the cylinders will be more uniform.

It is a further object of this invention to provide an improved cooling system arrangement for an engine which is disposed so that it extends parallel to the associated heat exchanger.

It is a further object of this invention to provide an improved cooling system for an engine wherein the engine has its water delivery and water exit ports between the ends of the engine.

In many forms of engine cooling systems, the coolant is delivered to the engine first to the cylinder block and then to the cylinder head. Of course, the cylinder head is the more highly heated area. This type of arrangement may not provide adequate cooling for the cylinder head. Also, it is the normal practice to mount the water pump relatively low in the cylinder block and this further makes it difficult to introduce coolant first to the cylinder head rather than to the cylinder block.

It is, therefore, a still further object of this invention to provide an improved cooling system for an engine wherein the water pump can be positioned more closely to the cylinder head so as to facilitate delivery of the cooling water to the cylinder head before the cylinder block.

SUMMARY OF THE INVENTION

A first feature of this invention is adapted to be embodied in a cooling system for an internal combustion engine having a plurality of aligned cylinders. A heat exchanger is disposed in parallel relationship to the engine. The engine has a cooling jacket and a water pump is disposed between the ends of the engine and on the side adjacent the heat exchanger for circulating coolant through the engine cooling jacket and through the heat exchanger.

Another feature of the invention is also adapted to be embodied in a cooling system for an internal combustion engine that has a plurality of aligned cylinders and a heat exchanger disposed parallel to the engine. A cooling jacket is provided for the engine and a thermostatic valve is provided in conduitry that connects the cooling jacket with the heat exchanger for controlling the temperature of the cooling jacket. In accordance with this feature of the invention, the thermostat is positioned between the ends of the engine and on the side adjacent the heat exchanger.

Yet another feature of this invention is adapted to be embodied in a cooling system for an internal combustion engine having a cylinder block, a cylinder head and an overhead camshaft mounted in the cylinder head. A camshaft drive arrangement is provided for driving the camshaft from the engine output shaft. This includes a plurality of shafts that are journaled for rotation about axes parallel to the engine output shaft axis and the camshaft axis. In accordance with this feature of the invention, a water pump for circulating coolant through the engine cooling jacket is driven from one of these intermediate shafts which intermediate shaft is disposed in proximity to the cylinder head and above the lower end of the cylinder block.

DETAILED DESCRIPTION OF THE PREFERRED EMBODIMENT OF THE INVENTION

Figure 1:
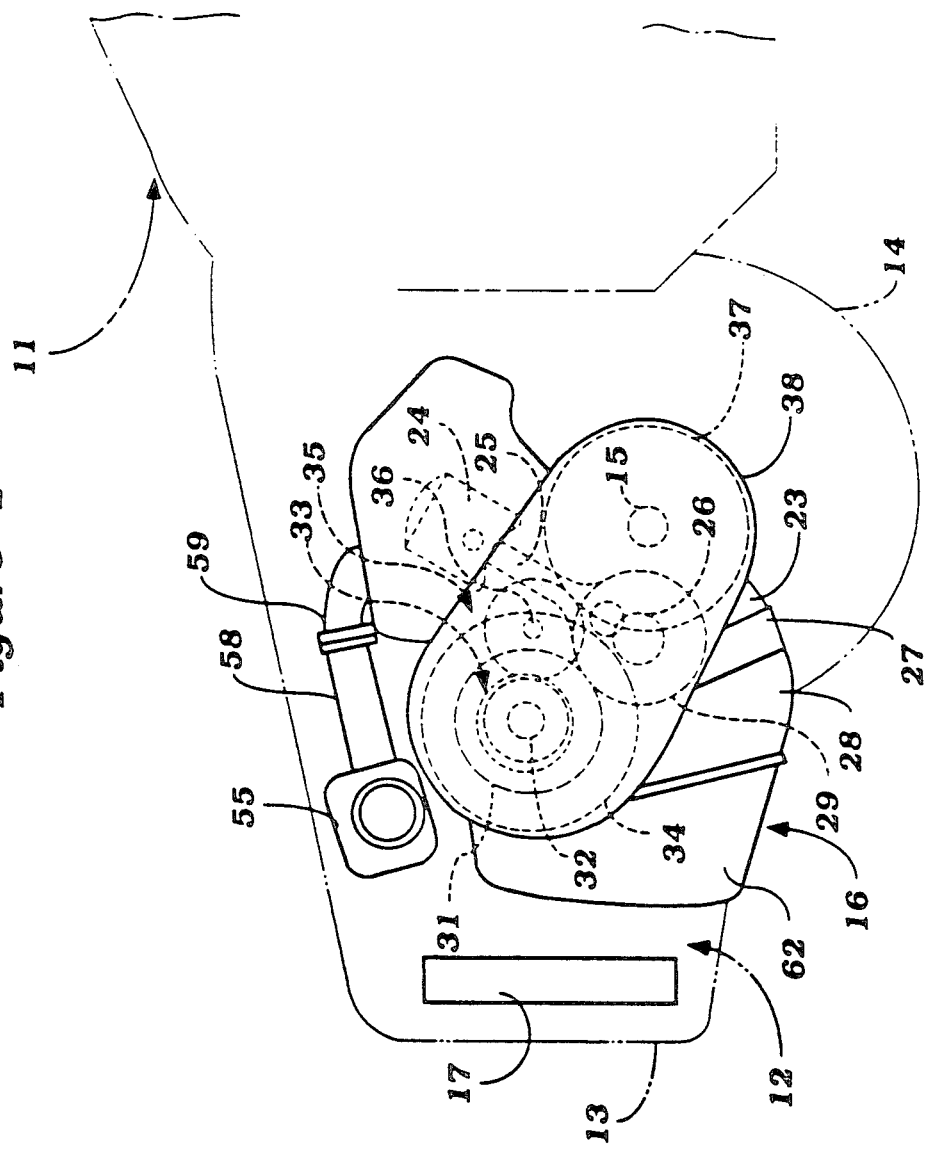
FIG. 1 is a side elevational view of a portion of a motor vehicle embodying an engine construction in accordance with an embodiment of the invention, with portions of the vehicle shown in phantom.
Figure 2:
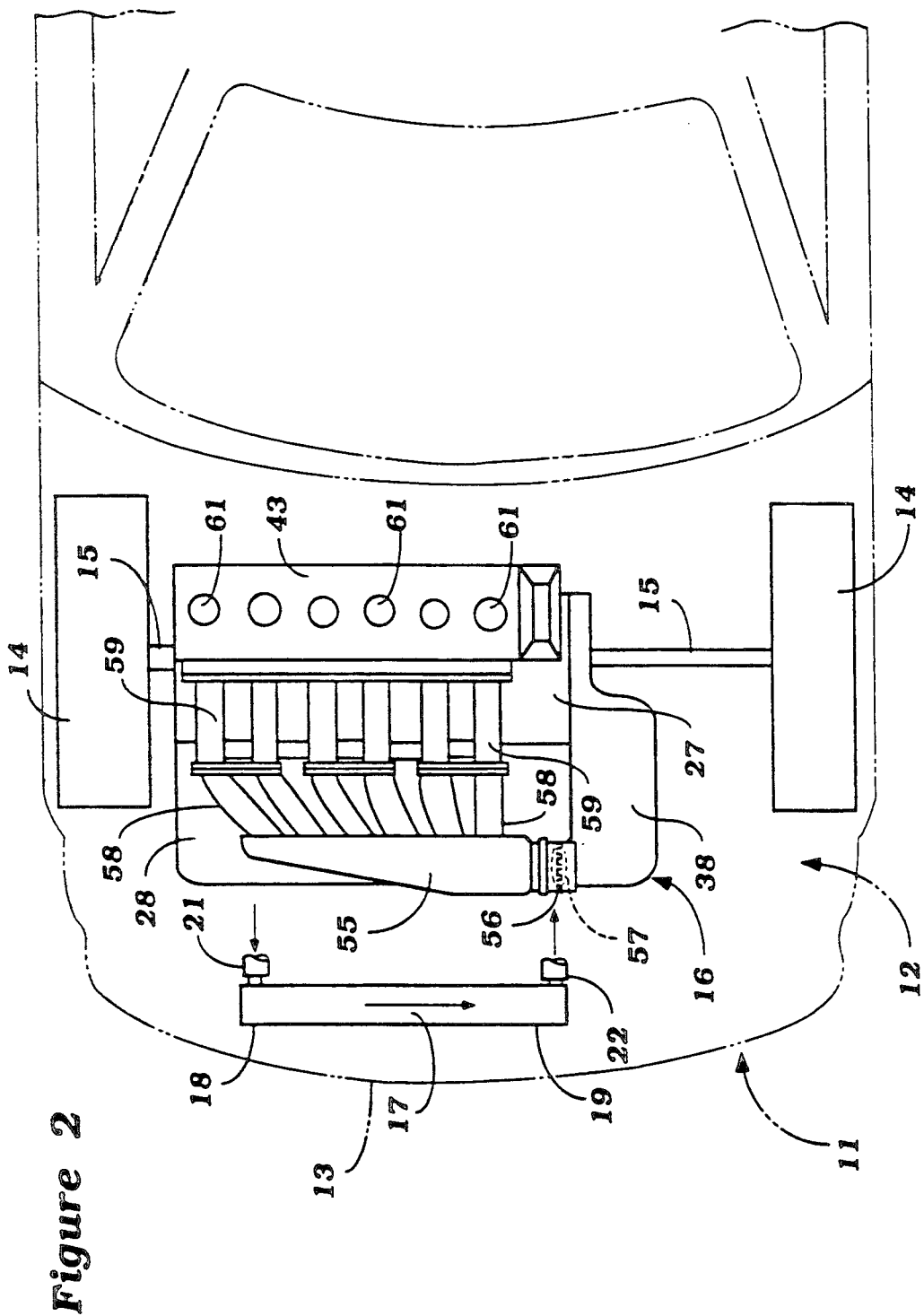
FIG. 2 is a top plan view of the portion of the vehicle shown in FIG. 1 with portions of the vehicle shown in phantom.

Referring first in detail to FIGS. 1 and 2, a motor vehicle powered by an engine construction in accordance with an embodiment of the invention is shown primarily in phantom and is identified generally by the reference numeral 11. Only the portion of the motor vehicle 11 associated with the engine compartment has been illustrated because the invention deals with the engine construction and its placement in this engine compartment and the cooling system therefor.

In the illustrated embodiment, the vehicle 11 is of the front engine transversely disposed front wheel drive type and has an engine compartment 12 that extends transversely across the front of the motor vehicle 11 and which is positioned rearwardly of an air inlet opening 13 which is formed in the body of the vehicle forwardly of the engine compartment 12. A pair front wheels 14 are suspended by the chassis of the vehicle 11 in a known manner and have associated with them axle shafts 15 which are driven in a manner to be described.

Figure 6:
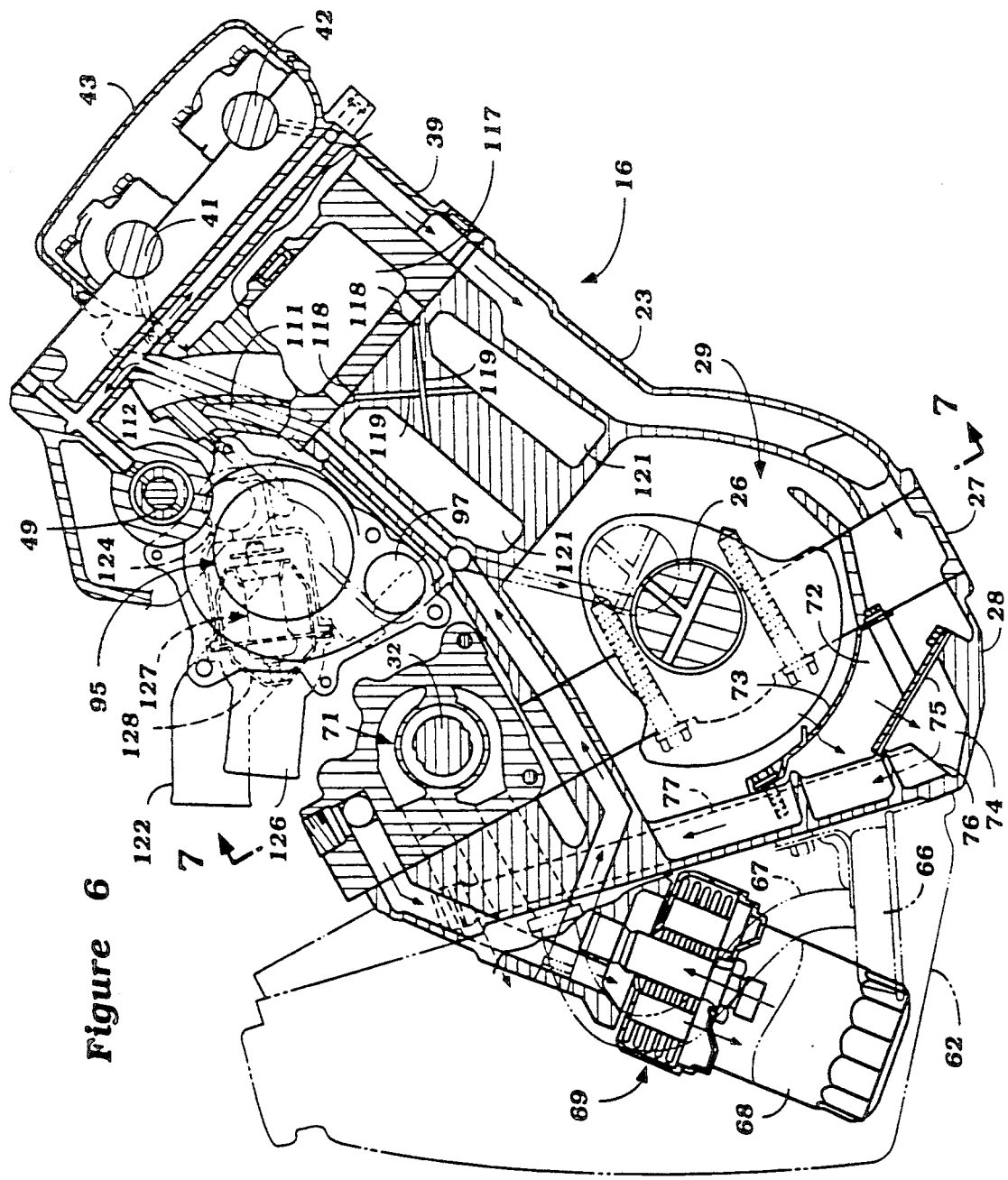
FIG. 6 is a cross sectional view taken along a plane perpendicular to the crankshaft of the engine and in proximity to the area where the oil filter is located.

A power unit, indicated generally by the reference numeral 16 and which is comprised of an internal combustion engine, a change speed transmission, and a final drive, is positioned transversely in the engine compartment 12 for driving the axle shafts 15. Basically, the power unit 16 has a construction as described in the copending application entitled "Engine Unit For Vehicle", Ser. No. 270,357, filed Nov. 14, 1988, and assigned to the Assignee hereof, and specifically the embodiment of FIGS. 6 through 8 thereof. Because of the basic similarity of the engine of this embodiment to that embodiment of Ser. No. 270,357, certain components have not been illustrated fully, nor will they be described in full detail. Where that is the case, reference may be had to the aforenoted copending application, the disclosure of which is incorporated herein by reference.

A radiator 17 of the cross flow type is positioned transversely in the engine compartment 12 directly behind the air inlet opening 13. As a cross flow radiator, the radiator 17 has header tanks 18 and 19 disposed at its opposite sides which receive coolant from the power unit 16 through a hose 21 and which return coolant to the power unit 16 through a hose 22. Other components of the cooling system will be described hereinafter.

Figure 5:
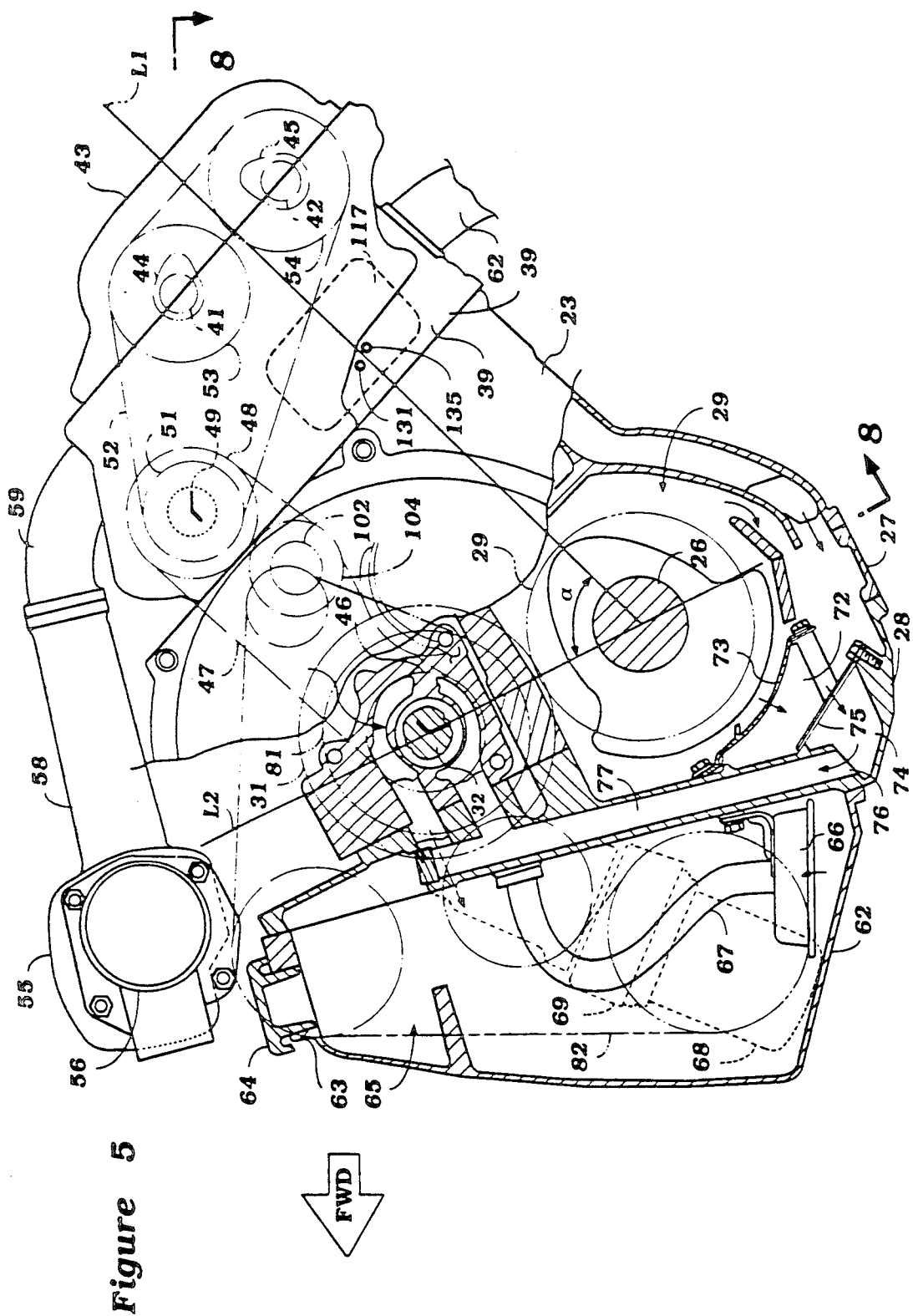
FIG. 5 is a side elevational view, in part similar to FIG. 1, on an enlarged scale and with portions broken away.

The engine portion of the power unit 16 includes a cylinder block 23 that is provided with a plurality of aligned cylinder bores in which pistons 24 reciprocate. The cylinder bores in which the pistons 24 reciprocate are inclined from the vertical rearwardly away from the engine compartment air inlet opening 13 along a line L1 as best seen in FIG. 5. In the illustrated embodiment, the engine has six cylinders although is to be understood that the invention can be practiced with engines having other numbers of cylinders. The pistons 24 are connected by means of connecting rods 25 for driving a crankshaft 26 that is rotatable about an axis that lies on the line L1 and which is disposed at the lower ends of the cylinders. The crankshaft 26 is rotatably journaled in a known manner.

A first crankcase portion 27 is affixed to the cylinder block 23 at its lower end. However, because of the angular disposition of the cylinder block 23, the crankcase portion 27 extends generally vertically along a line that is disposed at an acute angle to the vertical but which extends forwardly of a vertically extending plane from the line L1. This plane is generally designated by the line L2 and lies at an acute angle to the plane L2. A further crankcase portion 28 is affixed to the portion 27 and also extends vertically upward and is disposed forwardly of the crankcase portion 27. The portions 27 and 28 and the cylinder block 23 define a crankcase chamber 29 in which the crankshaft 26 rotates.

Figure 7:
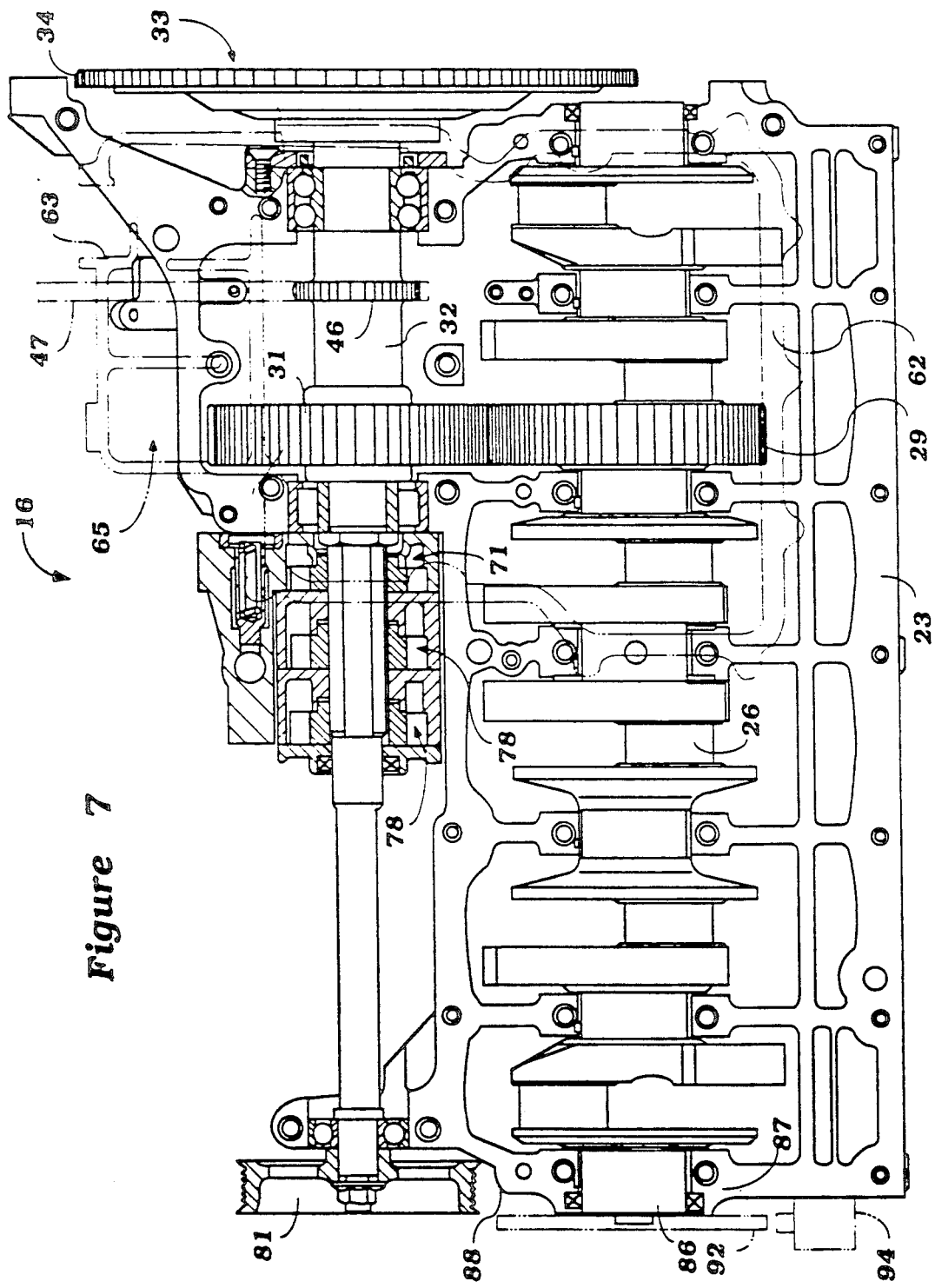
FIG. 7 is a cross sectional view taken along the line 7—7 of FIG. 6.
Figure 8:
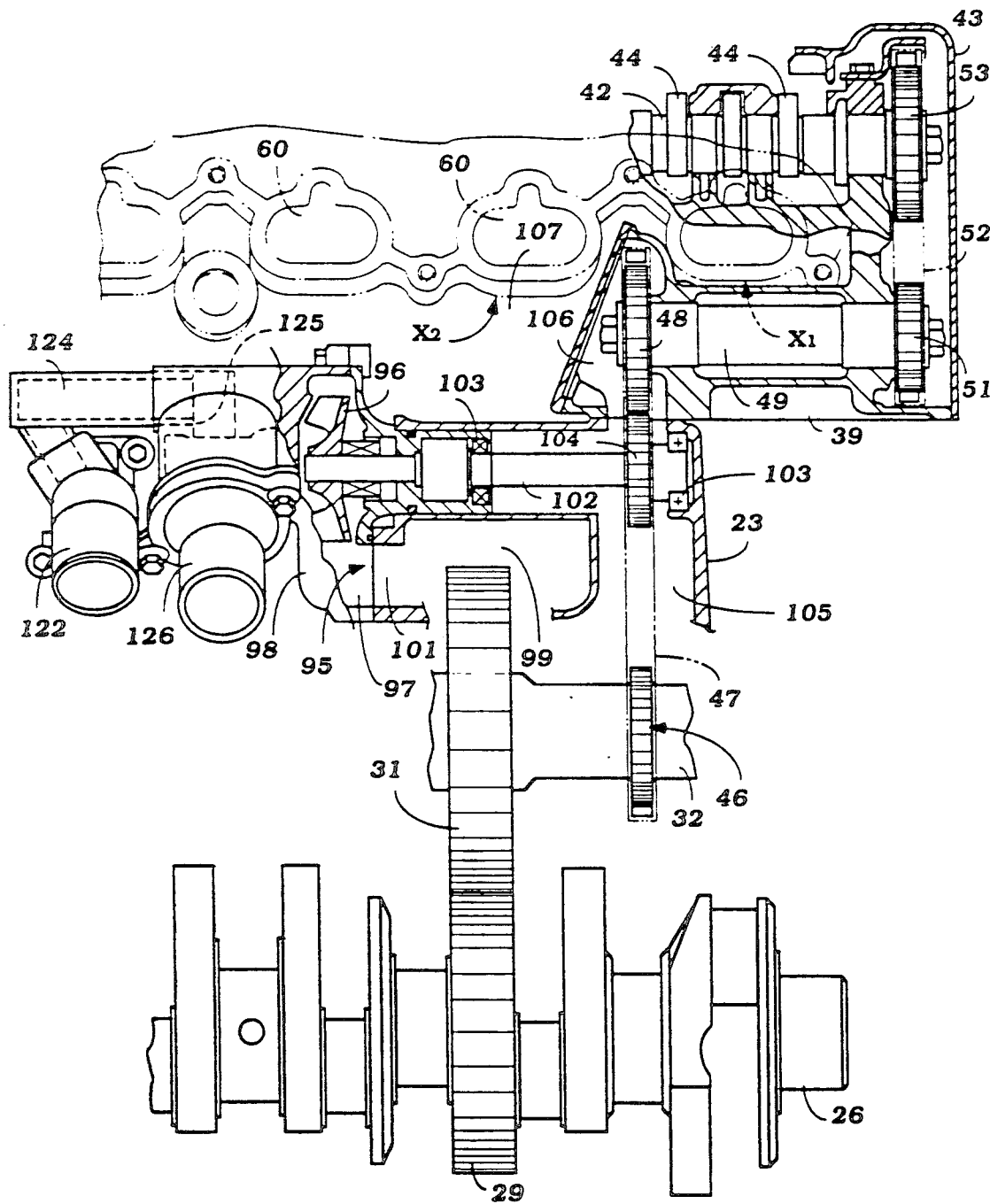
FIG. 8 is a cross sectional view taken along the line 8—8 of FIG. 5.
Figure 9:
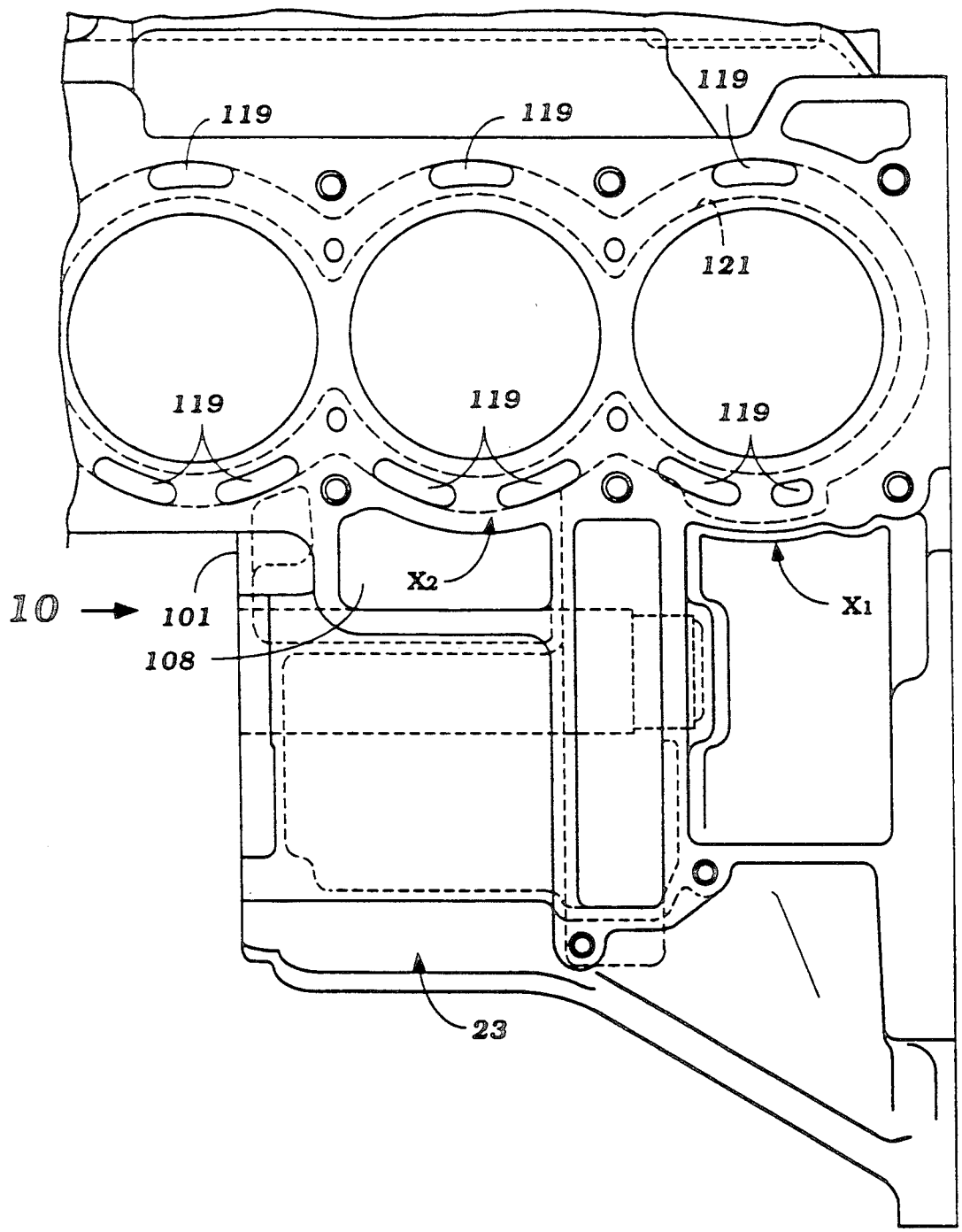
FIG. 9 is a view of the cylinder block at one end of the engine with the cylinder head removed and looking generally in a direction parallel to the cylinder bore axes.
Figure 10:
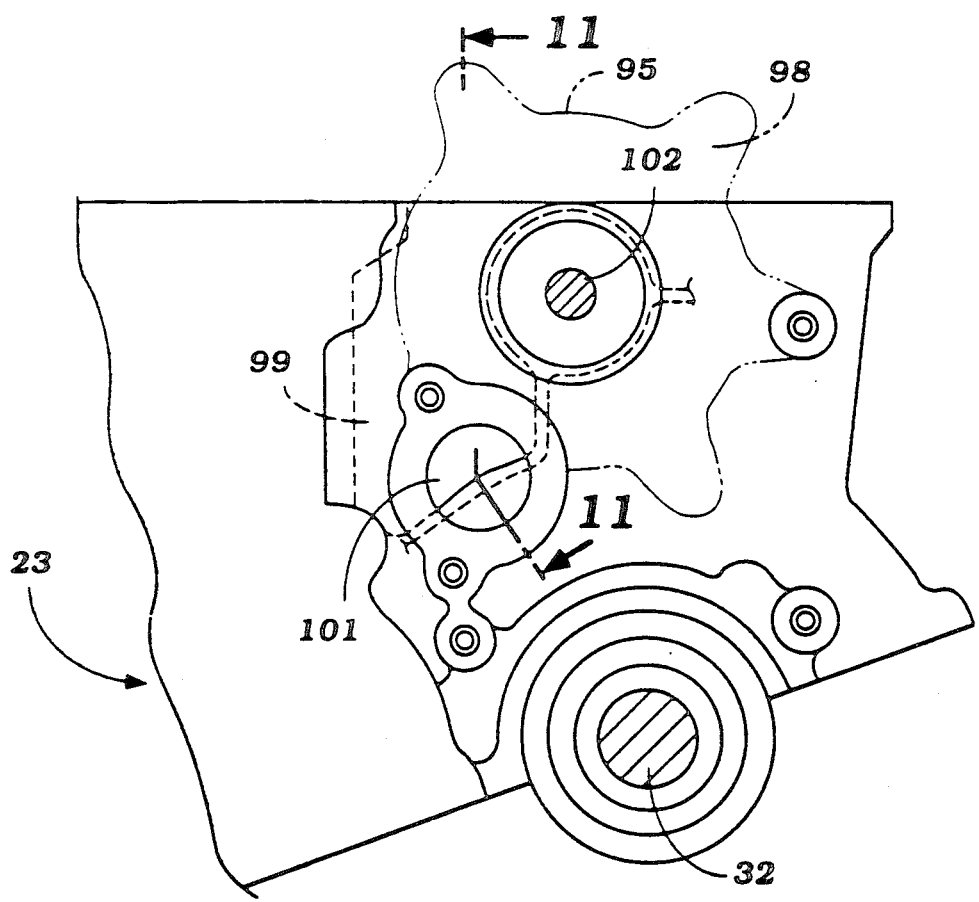
FIG. 10 is a view taken generally in the direction of the arrow 10 in FIG. 9 with the water pump assembly removed but shown in phantom for orientation purposes.

As may be seen in FIGS. 7 and 8, one of the cheeks of the crankshaft 26 is formed with an integral gear portion 29 which is enmeshed with a gear 31 that is affixed to or associated with an accessory or output shaft 32. The accessory or output shaft 32 is supported for rotation by the cylinder block 23 and crankcase portion 27 for rotation about an axis that is disposed parallel to the axis of rotation of the crankshaft 26 and the axle shafts 15, but which lies on the line L2. The line L2 is disposed at an acute angle, as aforenoted, to a vertically extending plane and at an acute angle $\alpha$ relative to the plane L1. This acute angle relationship permits a very compact engine, accessory and final drive assembly, as will become apparent.

With the prior art type of constructions and specifically that shown in aforenoted application Ser. No. 270,257, the output shaft axis 32 is disposed forwardly and at least at a right angle to the cylinder bore axis defined by the line L1. As a result, this axis is disposed at a relatively low height from the vertical and forwardly of the crankshaft axis. However, by disposing the output shaft angle 32 at an acute angle to the plane L1, the height is raised but the horizontal length of the engine is substantially reduced. As a result and as will be described, this permits a more compact assembly.

A flywheel, indicated generally by the reference numeral 33 and having a starter gear 34 is affixed for rotation with the output shaft 32. The flywheel 33 is associated with a clutch (not shown) as described in aforenoted application Ser. No. 270,357 for driving a primary shaft of a change speed transmission, indicated generally by the reference numeral 35. The change speed transmission 35 includes a secondary shaft 36 and a plurality of intermeshing gear sets.

The gear sets are contained on the transmission primary shaft and secondary shaft 36 for driving the secondary shaft 36 from the primary shaft at selected speed ratios. The secondary shaft 36 drives an input gear 37 of a differential assembly for driving the axle shafts 15 in a well known manner.

It should be noted that the acute angle between the lines L1 and L2 and the close positioning of the transmission secondary shaft 36 to the line L1 permits a very compact final drive assembly and keeps the distance between the primary shaft of the transmission 35 and the axis of rotation of the axle shafts 15 very close to each other. The close positioning of the output shaft axis and the axles 15 also makes it possible to use smaller diameter gears for the final drive and this further adds to the compactness of the assembly. A transmission casing cover 38 encloses the portion of the transmission which has been described for driving the axle shafts 15. This cover 38 is affixed to the cylinder block 23 and crankcase portions 27 and 28 in a suitable manner.

A cylinder head 39 is affixed in a known manner to the upper end of the cylinder block 23 and closes the cylinder bores in which the pistons 24 reciprocate. Overhead mounted intake and exhaust valves, as described in copending application Ser. No. 270,357, are mounted in the cylinder head 39 for controlling the admission of an intake charge and the exhaust of the burnt charge. These valves are operated by means of an intake camshaft 41 and an exhaust camshaft 42 that are journaled on the cylinder head assembly 39 and which are enclosed within a cam chamber closed by a cam cover 43. The camshafts 41 and 42 have respective cam lobes 44 and 45 for operating the intake and exhaust valves in the manner described in the aforenoted copending patent application.

A camshaft drive sprocket 46 (FIGS. 5, 7 and 8) is formed integrally on the accessory or output shaft 32 and drives a first timing chain 47. The first timing chain 47, in turn, drives a sprocket 48 that is affixed to an intermediate cam drive shaft 49. The cam drive shaft 49 is journaled in an appropriate manner on the cylinder head 39 and, in turn, drives a second sprocket 51. A second chain 52 drives a pair of driven sprockets 53 and 54 that are affixed to the camshafts 41 and 42 respectively for driving these camshafts. As noted in the aforenoted copending application, the two to one speed reduction between the crankshaft 26 and camshafts 41 and 42 may be achieved in stages through the camshaft drive mechanism as aforedescribed. Because this mechanism is described in more detail in the copending application, further description of it in this application is not believed to be necessary.

The intake valves, as aforedescribed, are associated with an air induction system that includes a plenum chamber 55 that extends transversely across the engine compartment 12 forwardly of the cylinder head and cylinder block 23. The plenum chamber 55 is provided with an air inlet portion 56 in which a throttle valve 57 (FIGS. 1 through 4) is positioned for controlling the engine speed. Air is delivered to the inlet section 56 from a remotely positioned air cleaner and silencer assembly (not shown).

The plenum chamber 55 has either affixed to it or formed integrally with it a plurality of runners 58 that cooperate with manifold pipes 59 which serve the individual cylinders of the engine and specifically the intake ports 60 of the cylinder head 39 in a known manner.

Figure 13:
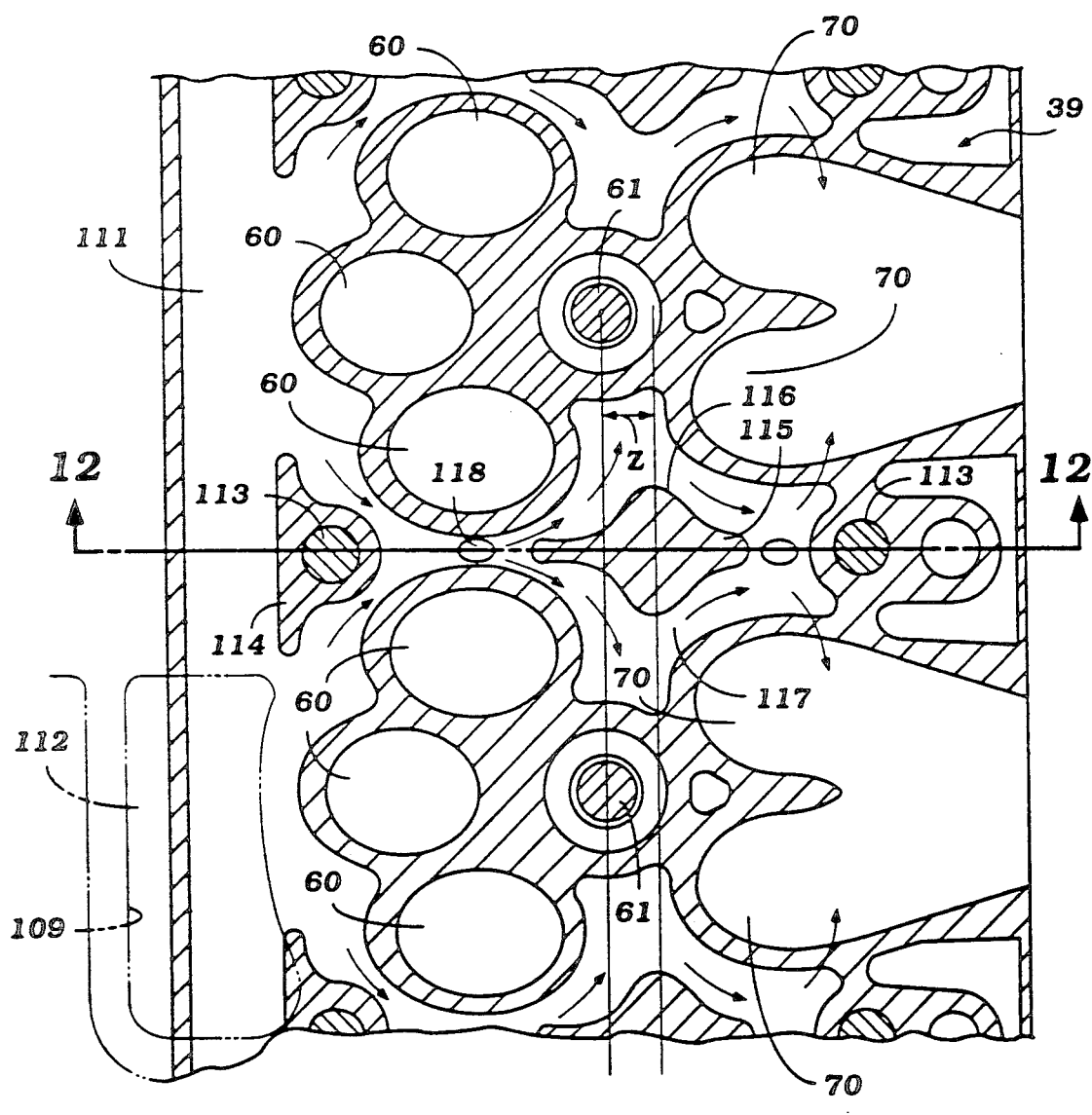
FIG. 13 is a cross sectional view taken along the line 13—13 of FIG. 12.
Figure 14:
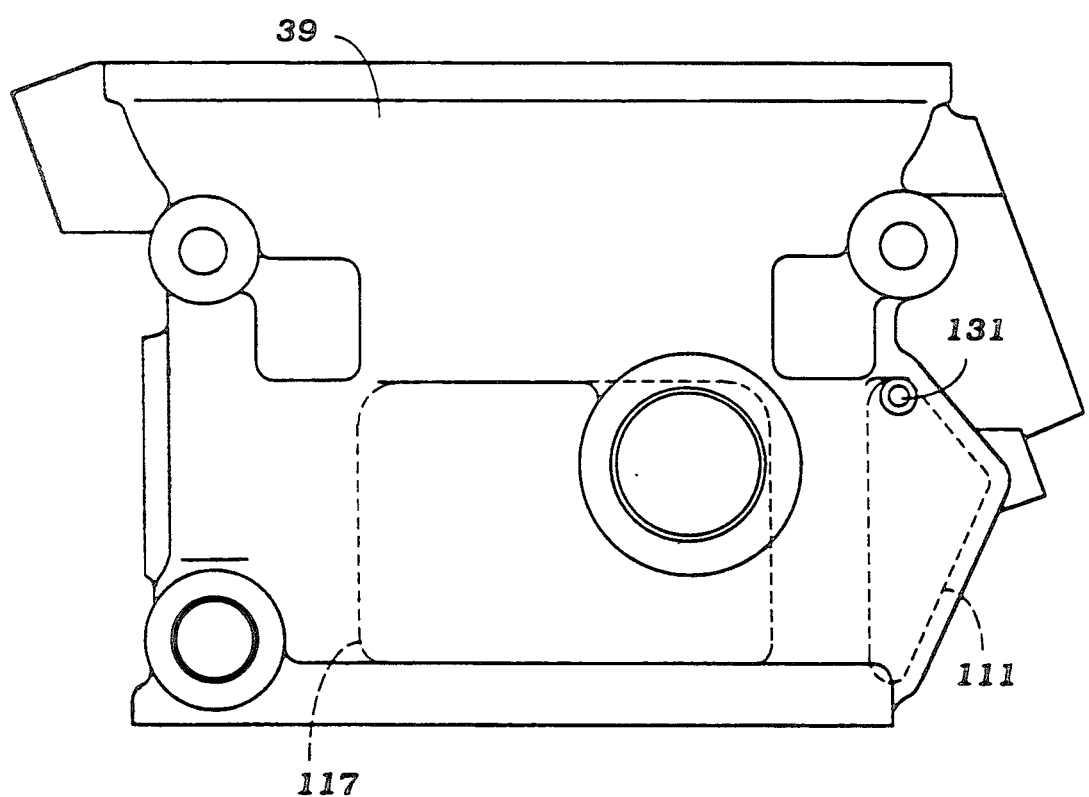
FIG. 14 is a front plan view of the cylinder head.

Spark plugs 61 (FIG. 13) are contained within spark plug pockets 61 formed in the cam cover 43 and are in turn threaded into the cylinder head 39 for firing the charge admitted to the combustion chambers of the engine. The ignition system for firing these spark plugs may be of any known type. The burnt exhaust gases are then discharged through the exhaust ports 70 of the cylinder head 39 to an exhaust manifold, shown partially and indicated by the reference numeral 62.

The engine is provided with a dry sump lubrication system that includes a dry sump lubricant reservoir 62 that is supported from the crankcase member 28 and which extends forwardly of the engine and vertically upwardly in the area to the rear of the air inlet opening 13 to the engine compartment 12. The top of the reservoir 62 has a filler neck 63 to which a detachable cap 64 is attached. The tank 62 has a large internal volume 65 and the filler neck 63 and a portion of the volume 65 extends upwardly beyond the axis of rotation of the engine output shaft 32. As a result, the tank 62 has a large surface area that will be exposed to the cooling air flow. This will insure that the lubricant is well cooled. The greater height and larger volume for the dry sump lubricant reservoir 62 is made possible because of the acute angle relationship between the planes L1 and L2 which has been previously discussed. This permits the tank 62 to be positioned rearwardly in the engine compartment and can have a significant height without adversely effecting the hood line of the vehicle.

A lubricant pressure pump 71 (FIGS. 5 through 7) of the tricodal type is driven by the accessory shaft 32 and draws oil from the lower portion of the tank 62 through a strainer inlet 66. A conduit 67 extends from the strainer inlet 66 to the inlet side of the pressure pump 71. Lubricant is then delivered from the pressure pump 71 to an oil filter 68 that is mounted on the front of the crankcase casing 28 with an oil cooler 69 being interposed between it and the crankcase member 28. The oil cooler 69 receives coolant from the cooling system including the radiator 17 in a manner to be described. The lubricant is then delivered to the various components of the engine for their lubrication in a suitable manner with a portion of the flow path being shown by the arrows in FIG. 6.

The lubricant will then return to the crankcase chamber 29 by gravity flow and specifically to an area 72 positioned below a baffle plate 73. The baffle plate 73 is juxtaposed to the crankshaft 26 so as to control the oil flow in this area. The oil will then drain to a well 74 formed below a screen 75. This oil is then picked u by the inlet 76 of a scavenge line 77 that is formed in the crankcase portion 28 for delivery to a pair of scavenge pump assemblies 78. The scavenge pump assemblies 78 are driven from the accessory shaft 32 and are also of the tricodal type. The scavenged oil is then returned to the dry sump tank 62 through a return conduit 79. The dry sump tank 62 is provided with a baffled breather system (not shown) for venting purposes.

An accessory drive pulley 81 is affixed to the end of the accessory or output shaft 32 opposite to the flywheel 33 and drives a belt 82. The belt 82 drives a plurality of accessories such as an alternator 83, power steering pump 84 and air conditioning compressor 85. As may be seen from FIG. 7, the accessory drive pulley 81 is affixed to the accessory drive shaft 32 at a point that is inwardly of the adjacent bearing end 86 of the crankshaft 26 which bearing end is supported in a boss 87 of the cylinder block 23 and crankcase.

There is provided a recess 88 adjacent this area so as to permit the accessory drive shaft 32 to rotate about an axis that is disposed at a very close distance to the axis of rotation of the crankshaft 26. This arrangement also insures that the engine will have a short overall length and that the accessories which are mounted externally of the engine are disposed between its ends to provide a compact assembly. However, due to the angular disposition of the cylinder block 23 and the bores therein, these accessories are readily available for servicing.

It should be noted that the portion of the output or accessory shaft 32 that is driven by the crankshaft 26 and which drives the camshaft mechanism is disposed internally of the body of the engine and specifically of the cylinder block 23. However, the portion of the shaft 32 which drives the pulley 81 and pumps 71 and 78 is external of this body.

In conjunction with the ignition system for the engine, a timer disk or wheel 92 (FIGS. 3 and 7) is affixed to the end of the crankshaft 26 adjacent the accessory drive pulley 81 and carries a marker 93 that cooperates with a fixed pulser coil 94 so as to provide an indication of crankshaft rotation.

It has already been noted that the engine 16 is of the liquid cooled type and embodies a cross flow radiator 17 that is disposed transversely in the engine compartment and, accordingly, which extends parallel to the length of the engine. In this regard, although the engine 16 is disposed transversely in the engine compartment 12, the end of the engine which supports the camshaft drive is considered to be the front of the engine and the opposite end is the rear of the engine. The side of the engine facing the inlet opening 13 is considered as the front side whereas the remaining side is considered the rear side. As already noted, the front side of the engine is the intake side and the rear side is the exhaust side.

The coolant is circulated through the radiator 17 and cooling jackets of the engine (as will be described) by a water pump assembly, indicated generally by the reference numeral 95 and shown in most detail in FIGS. 8 through 15, although the construction is shown in other figures additionally. The water pump assembly 95 includes an impeller 96 that is contained within a pumping cavity 97 formed in part by a cover plate 98 that is affixed to a side of the cylinder block 23 adjacent a coolant cavity 99 formed therein. The water pump outlet from the pumping cavity 97 communicates with the cavity 99 through a delivery conduit 101.

An impeller 96 is affixed for rotation with a pump drive shaft 10 that is journaled in the cylinder block 23 by means of spaced bearings 103. An idler sprocket 104 is affixed to the shaft 102 and is engaged with the camshaft drive chain 47 on its return side. As may readily be seen from FIG. 5, this positioning of the pump shaft 102 permits a very compact assembly and, at the same time, permits the water pump assembly 95 to be disposed in close proximity to the cylinder head 39. This is important because, in accordance with a feature of the invention, the cooling water is delivered first to the cylinder head cooling jacket before the cylinder block cooling jacket so as to effect more rapid cooling of the more highly heated combustion chamber areas.

Figure 3:
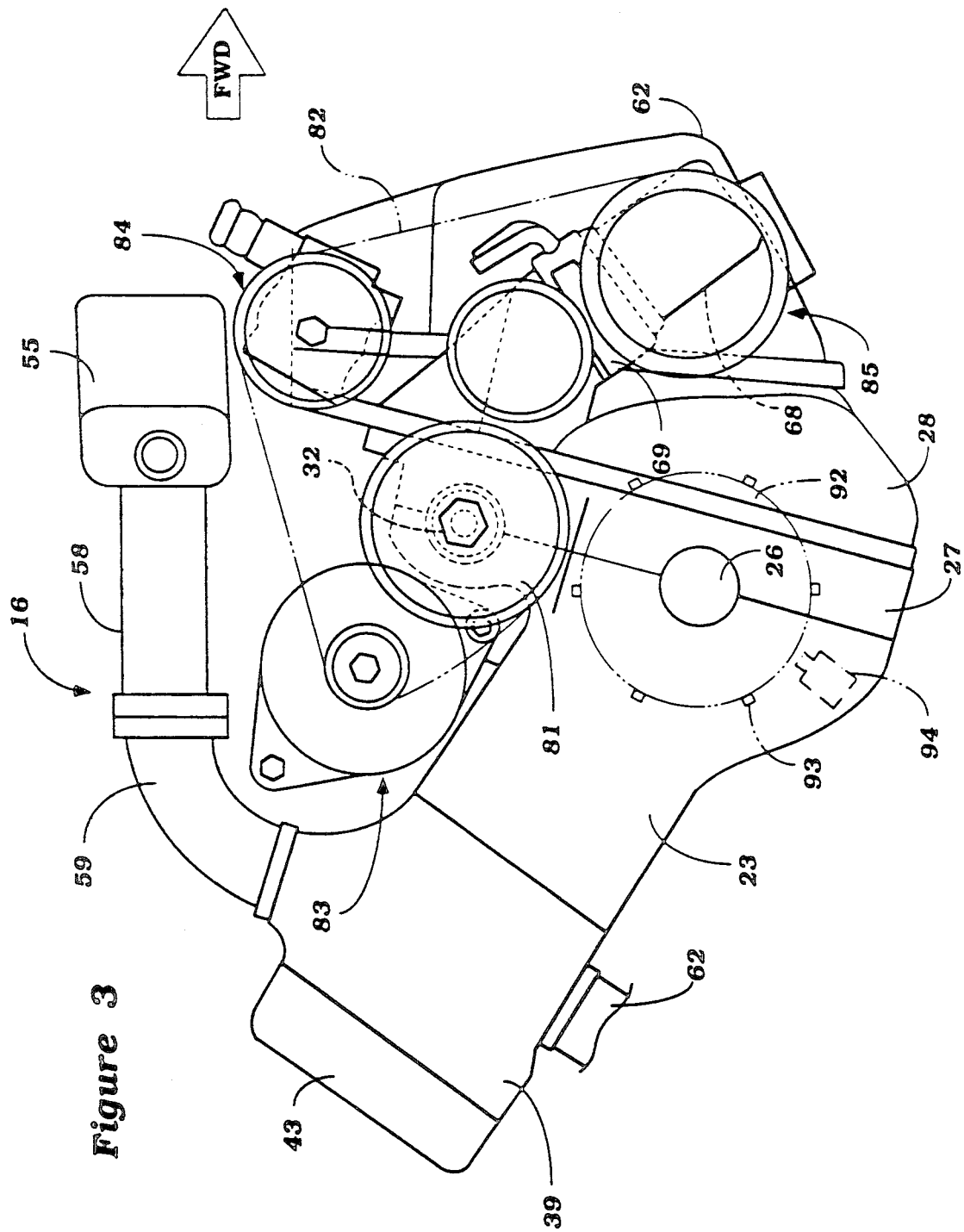
FIG. 3 is an enlarged side elevational view of the engine unit looking in the direction opposite to that shown in FIG. 1.
Figure 4:
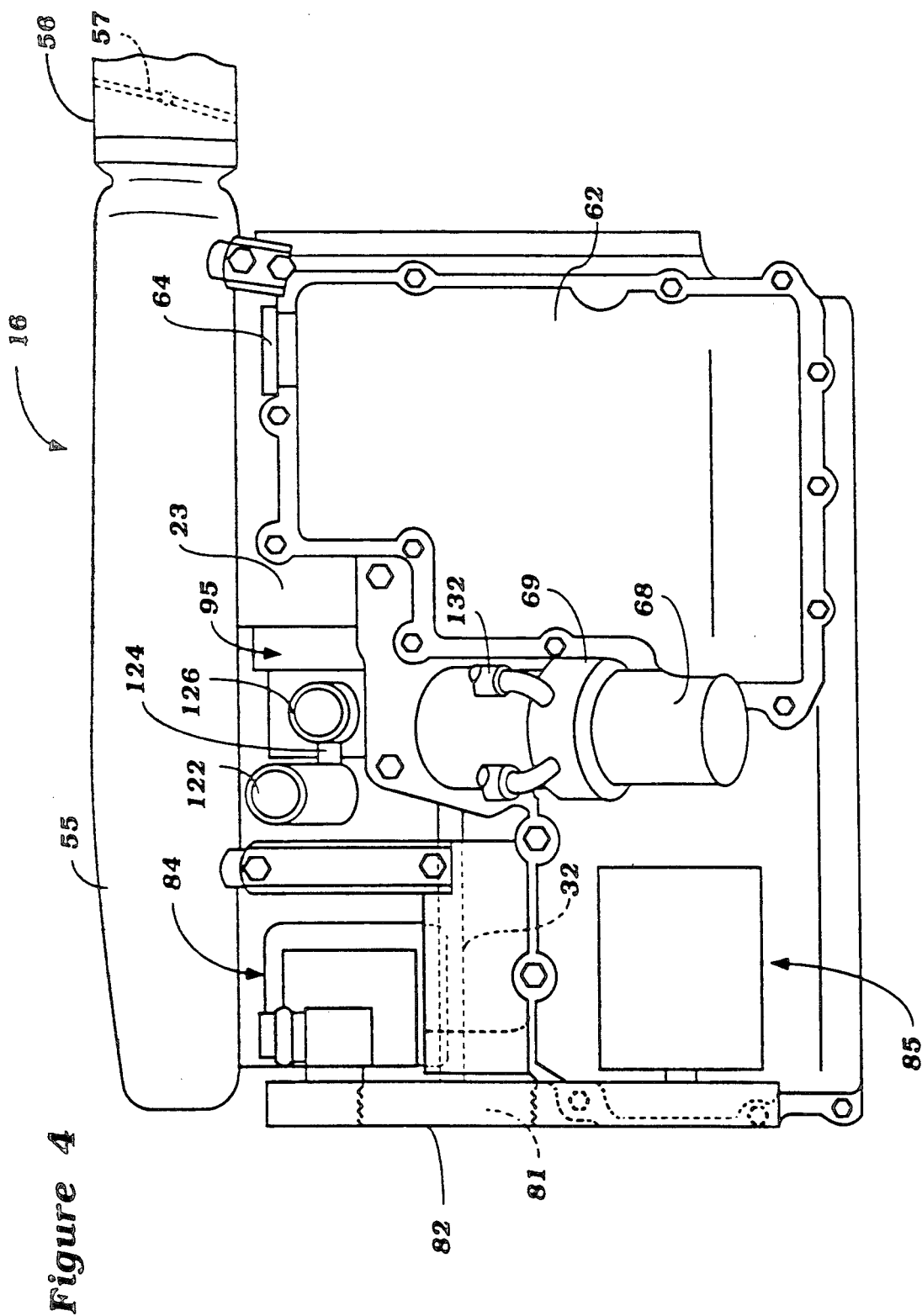
FIG. 4 is an enlarged front elevational view of the engine.

It should be noted that the chain 47 is disposed so that the sprocket 104 and sprocket 48 for the intermediate camshaft drive shaft 49 lie in a recess formed between the intake ports 60 of the first and second cylinders, indicated schematically at X1 and X2 as may be seen in FIG. 3. This permits a further compaction of the overall construction without adversely effecting servicing of the components. It should be noted that the cylinder block 23 is provided with a recess 105, which has been previously referred to, in which the chain 47 is positioned. This recess 105 cooperates with a corresponding recess 106 formed in the cylinder head 39, the rear end of which recess is closed by a closure plate 107. Although the configuration is described as being between the first and second cylinders X1 and X2, it is to be understood that the water pump assembly can be positioned anywhere along the front side of the engine. However, there are advantages to putting it closer to the front end of the engine so as to minimize the shaft length and keep the assembly more compact.

As has been noted, it is desirable to introduce the cooling water from the water pump 95 first to the cylinder head cooling jacket rather than to the cylinder block cooling jacket. Although the water pump 95 outputs coolant to the cylinder block pocket 99, this pocket does not communicate directly with the cooling jacket of the cylinder block, which will be described later. Rather, the pocket 99 has a discharge port 108 on its upper face (FIG. 11) which communicates directly with a corresponding inlet port 109 formed in a lower face of the cylinder head 39. As may be best seen in FIG. 12 and 13, the cylinder head is provided with a longitudinally extending main gallery 111 that extends along the front or the intake side of the cylinder head 39 and which communicates with the inlet opening 109 through a delivery passage 112 that is formed in an embossment of the cylinder head adjacent the second cylinder.

Figure 11:
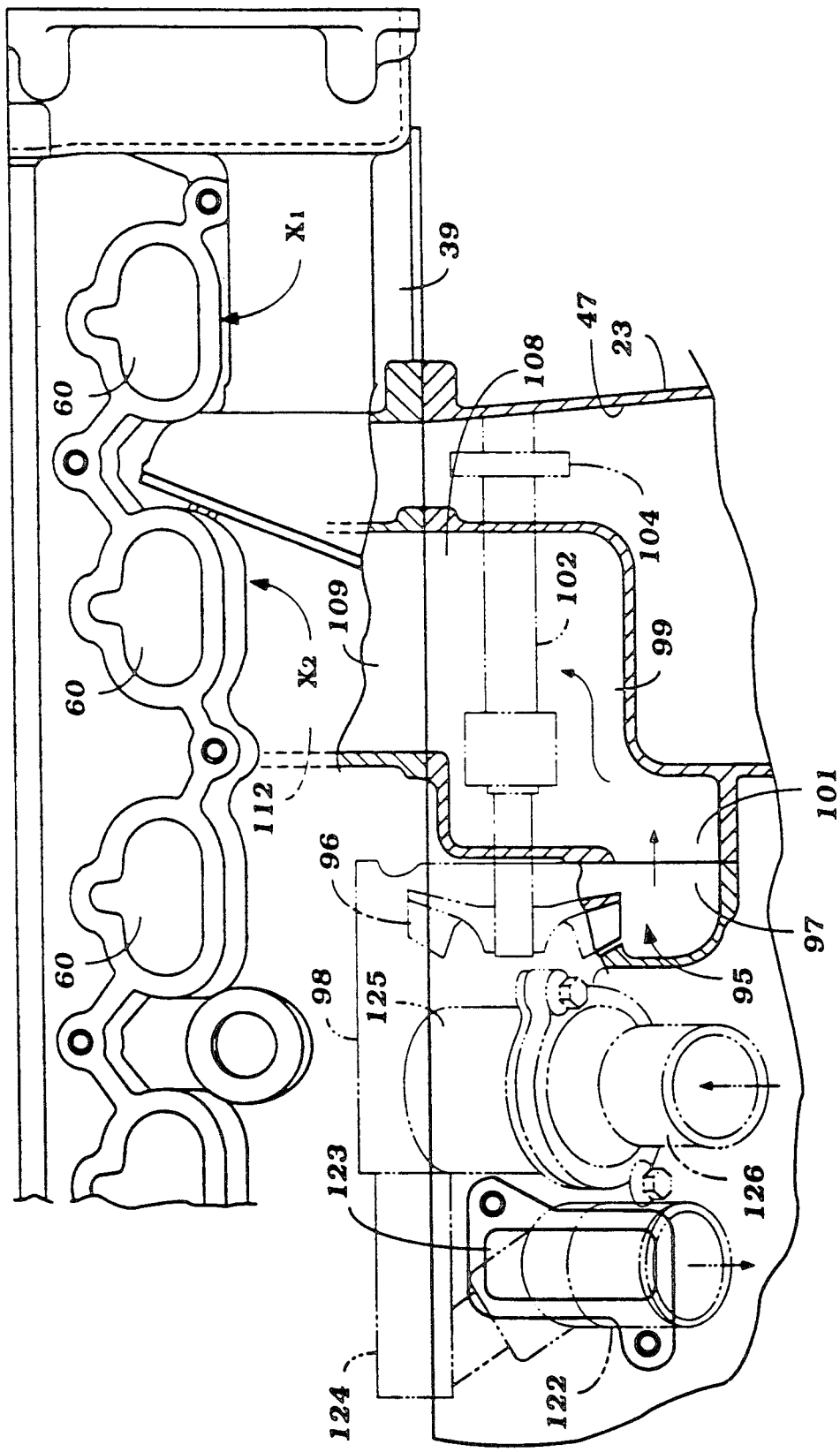
FIG. 11 is a view taken generally along the line 11—11 of FIG. 10.
Figure 12:
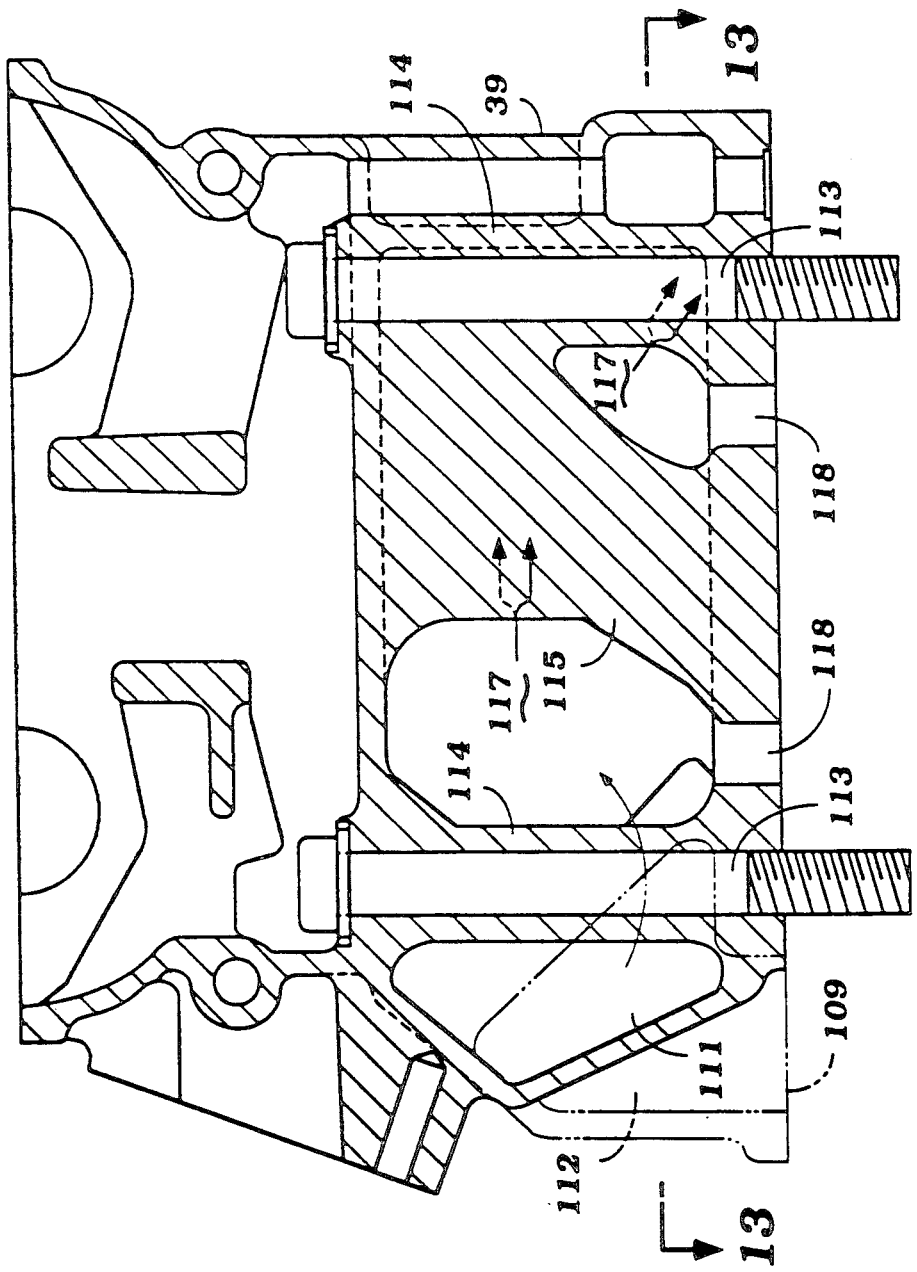
FIG. 12 is a cross sectional view taken along the line 12—12 of FIG. 13.

Continuing to refer to these figures, a plurality of hold down studs or bolts 113 extend through bosses 114 formed in the cylinder head assembly for affixing the cylinder head to the cylinder block. The bosses 114 define a plurality of openings that register around the intake ports 60 of the individual cylinders for delivering coolant first to these intake ports so as to insure that they are well cooled and to increase the volumetric efficiency of the engine. It should be noted that the spark plugs 61 are positioned in a nested fashion between the intake ports 60 so as to insure good cooling of the spark plugs. In the illustrated embodiment, the engine is provided with three intake valves for each cylinder. These intake valves each have individual ports 60 that cooperate with a single intake opening in the side of the cylinder head as shown in FIG. 11 so that these ports are, in effect, siamese.

After the cooling water has passed around the intake ports 60, it will encounter flow dividers 115 that are positioned between the intake ports of the respective cylinders and the exhaust ports 70 thereof. These flow dividers have large protuberances 116 which are spaced a distance Z in a transverse direction from the spark plugs 61 so as to insure good cooling of the spark plugs. The cooling water then cools the exhaust ports 70. The cylinder head cooling jacket outside of the main gallery 111 is identified generally by the reference numeral 117 and as may be seen in the Figures, provides adequate cooling for the cylinder head with water which has not been preheated because of its flow through the cylinder block.

The lower surface of the cylinder head 39 is provided with a pair of downwardly facing coolant discharge ports 118 which are disposed in pairs on opposite sides of the cylinder head 39 and between adjacent cylinders. These passageways 118 cooperate with corresponding passageways 119 formed in the upper deck of the cylinder block 23 (FIGS. 6 and 9) so as to deliver coolant to the cylinder block cooling jacket 121 which generally extends around the individual cylinder bores. As may be best seen in FIG. 9, the cylinder block cooling jacket 121 does not extend around the full circumference of the cylinder bores. This is so as to permit a more compact construction for the cylinder block and does not adversely effect its cooling.

The cylinder block cooling jacket 121 has an outlet opening to which a water discharge fitting 122 (FIGS. 4, 6, 11 and 15) is affixed. The water outlet fitting 122 may be formed as part of a housing assembly that includes the housing assembly for the water pump 95 so as to facilitate ease of construction. The cylinder block cooling outlet is indicated at 123 in FIG. 11, wherein the fitting 122 is shown in phantom. The housing in which the fitting 122 is formed, is provided with a bypass passageway 124 that extends to a thermostat housing assembly 125. This housing assembly may also be formed from the same housing as the water pump and the outlet fitting 122 but preferably has a separable cap section 126 so as to permit insertion and removal of a thermostatic valve assembly, indicated generally by the reference numeral 127. The thermostatic valve assembly 127 has a caging portion 128 that is affixed between the main housing 125 and the discharge fitting 126.

It should be noted that cooling water enters the thermostat housing 125 in a direction perpendicular to the radiator 17 and cylinder block and then turns through 90° for entry into the water pump 95. This provides a relatively compact and yet effective cooling system flow pattern.

Figure 15:
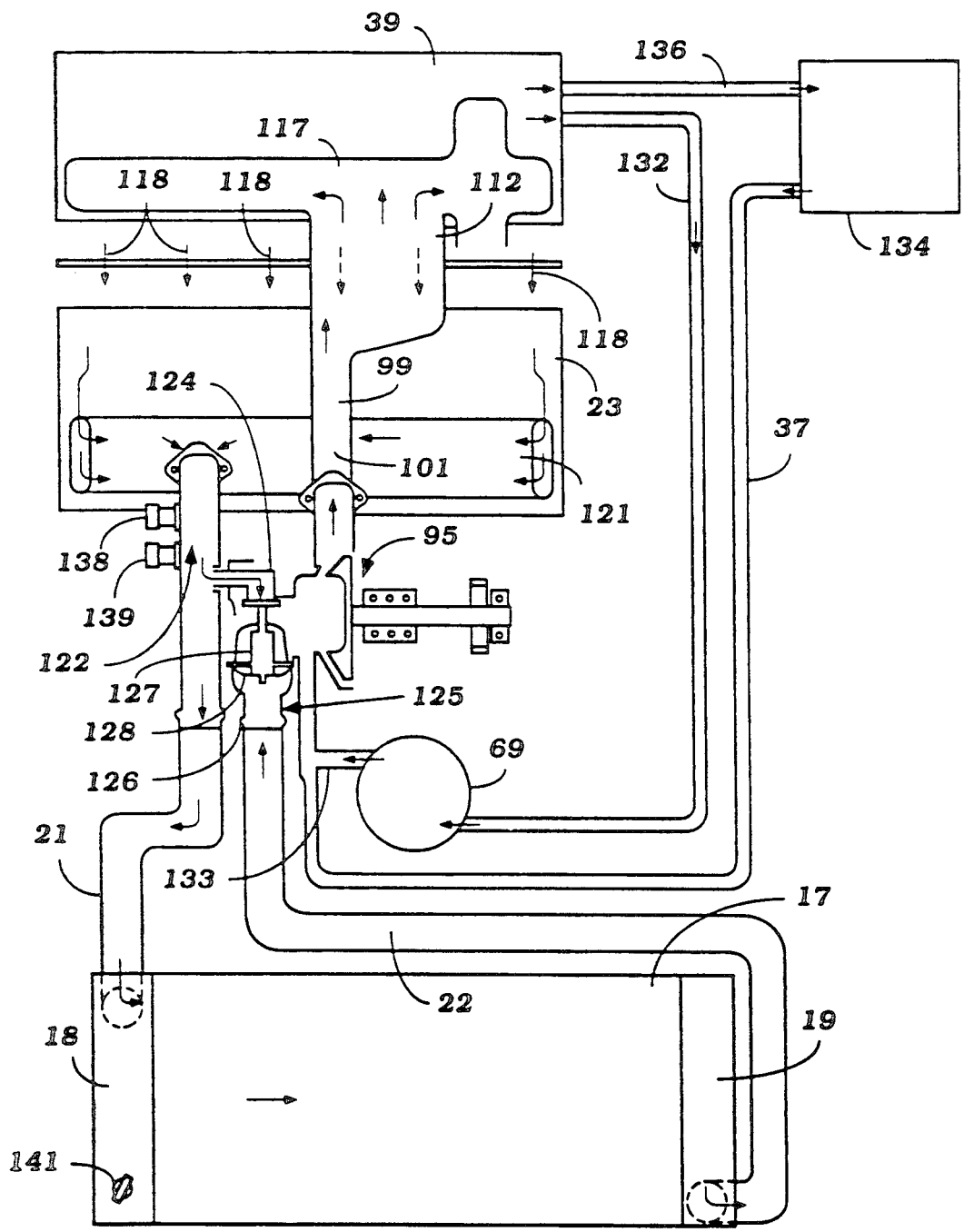
FIG. 15 is a schematic view showing the cooling system of the engine.

The entire cooling system and its flow path will now be described by particular reference to FIG. 15. As has been previously noted, the outlet header tank 19 of the cross flow radiator 17 communicates with a hose 122 that is fixed to the thermostat housing cover 125 so as to deliver water to the engine. When the engine is at its operating temperature, as indicated in FIG. 15, the thermostatic valve 127 will be open and the bypass passageway 124 will be closed. The water pump 95 will then deliver water initially into the pocket 99 of the cylinder block 23 and then immediately be transferred to the cylinder head through the opening 109 for circulation through the cylinder head cooling jacket 117. This coolant is then returned to the cylinder block cooling jacket 121 through the passageways 118. The coolant can then return to the radiator through the outlet fitting 122 and hose 21 so as to enter the inlet header tank 18.

Before the engine has been heated, the thermostatic valve 127 will move so as to open the bypass passageway 124 and preclude coolant from entering the cooling jacket from the radiator 17. The flow of coolant will be then again through the cylinder head cooling jacket 117, cylinder block cooling jacket 121 and returned to the water pump through the bypass passageway 124.

It should be noted that the cylinder head cooling jacket 117 is provided with an outlet opening 131 in its front face that coacts with a conduit 132 for delivering coolant to the oil cooler 69. This coolant is then returned through a return conduit 133. As a result, coolant will always be circulated through the oil cooler 69 even when the thermostatic valve 127 is closed. This will not only provide for heating of the oil initially to operating temperature, but will also prevent air from being collected in the water jacket of the cylinder head. There is also provided a heater 134 for the associated vehicle and the cylinder head 39 is provided with an outlet duct 135 for supplying heated water to the heater 134 through a hose 136. This coolant is returned through a return hose 137.

The system may also include a water temperature sensor 138, a water temperature sensor 139 and a sensor 141 positioned in the header tank 18 for controlling a thermostatically operated fan. Of course, the location of the various conduits and outlets can be varied but the described construction is particularly effective in providing effective cooling and also the purging of air from the system. It is also to be understood that the foregoing description is that of a preferred embodiment of the invention, and that various changes and modifications may be made without departing from the spirit and scope of the invention, as defined by the appended claims.

I claim:

1. A cooling system for an internal combustion engine having a plurality of aligned cylinders, a heat exchanger disposed parallel to and on one side of said engine, a cooling jacket for said engine, a centrifugal type water pump disposed between the cylinders at the ends of said engine and on the side of said engine adjacent said heat exchanger for circulating coolant through said engine cooling jacket and through said heat exchanger, said coolant pump including a coolant pump drive shaft rotating about an axis parallel to the heat exchanger, and a thermostatic valve for controlling the flow between said engine cooling jacket and the heat exchanger, positioned on the side of said engine adjacent said water pump and between the cylinders at the ends of said engine.

2. A cooling system as set forth in claim 1 further including an L shaped inlet affixed to the cooling pump and having a portion communicating with the heat exchanger that extends perpendicularly to the heat exchanger.

3. A cooling system as set forth in claim 1 wherein the thermostat housing forms the inlet to the water pump and further including an outlet from the engine to the heat exchanger extending perpendicularly to the heat exchanger.

4. A cooling system as set forth in claim 3 wherein the thermostat housing further forms a water outlet portion communicating with a water outlet opening formed in the engine.

5. A cooling system as set forth in claim 4 further including a bypass opening extending through the thermostat housing from the engine water outlet opening to the water pump.

6. A cooling system as set forth in claim 1 wherein the engine cooling jacket includes a cylinder head cooling jacket and a cylinder block cooling jacket.

7. A cooling system as set forth in claim 6 wherein coolant is delivered from the water pump first to the cylinder head cooling jacket and subsequently to the cylinder block cooling jacket.

8. A cooling system as set forth in claim 7 wherein coolant is delivered from the water pump to the cylinder head cooling jacket through a passage formed in the cylinder block and independent of the cylinder block cooling jacket.

9. A cooling system as set forth in claim 7 wherein the thermostat housing forms the inlet to the water pump and further including an outlet from the engine to the heat exchanger extending perpendicularly to the heat exchanger.

10. A cooling system as set forth in claim 9 wherein coolant is delivered from the water pump to the cylinder head cooling jacket through a passage formed in the cylinder block and independent of the cylinder block cooling jacket.

11. A cooling system as set forth in claim 9 further including a bypass passageway extending between the engine cooling jacket outlet and the water pump inlet for bypassing the heat exchanger when the thermostatic valve is closed.

12. A cooling system for an internal combustion engine having a plurality of aligned cylinders, at least one overhead mounted camshaft drive arrangement comprising an intermediate shaft for driving said camshaft and means for driving said intermediate shaft from the engine output shaft, a heat exchanger disposed parallel to and at one side of said engine, a cooling jacket for said engine, a water pump disposed between the cylinders at the ends of said engine and the side adjacent said heat exchanger for circulating coolant through said engine cooling jacket and through said heat exchanger, said water pump having a water pump drive shaft, and means for driving said water pump drive shaft from said intermediate shaft in the camshaft drive arrangement.

13. A cooling system as set forth in claim 12 wherein the intermediate shaft comprises an idler shaft that carries an idler sprocket engaged with a chain drive of the camshaft driving arrangement.

14. A cooling system as set forth in claim 13 wherein the engine cylinder block is inclined from the vertical in a direction away from the heat exchanger.

15. A cooling system as set forth in claim 13 wherein the camshaft drive arrangement includes a first chain drive for driving a camshaft drive shaft from the engine output shaft and a second chain drive for driving the camshaft from the camshaft drive shaft, the idler shaft being driven by the first chain drive.

16. A cooling system as set forth in claim 15 wherein the engine cylinder block is inclined from the vertical in a direction away from the heat exchanger.

17. A cooling system as set forth in claim 12 wherein the engine cylinder block is inclined from the vertical in a direction away from the heat exchanger.

18. A cooling system as set forth in claim 17 wherein the coolant pump includes a coolant drive shaft rotating about an axis parallel to the heat exchanger.

19. A cooling system as set forth in claim 18 wherein the coolant pump is a centrifugal pump.

20. A cooling system as set forth in claim 19 further including an L shaped inlet affixed to the cooling pump and having a portion communicating with the heat exchanger that extends perpendicularly to the heat exchanger.

21. A cooling system as set forth in claim 19 further including a thermostatic valve for controlling the flow between the engine cooling jacket and the heat exchanger.

22. A cooling system as set forth in claim 21 wherein the thermostatic valve is positioned on the side of the engine adjacent the water pump and between the ends of the engine.

23. A cooling system as set forth in claim 22 wherein the thermostat housing forms the inlet to the water pump and further including an outlet from the engine to the heat exchangers extending perpendicularly to the heat exchanger.

24. A cooling system as set forth in claim 23 wherein the engine cooling jacket includes a cylinder head cooling jacket and a cylinder block cooling jacket.

25. A cooling system as set forth in claim 24 wherein coolant is delivered from the water pump first to the cylinder head cooling jacket and subsequently to the cylinder block cooling jacket.

26. A cooling system for an internal combustion engine having a plurality of aligned cylinders, a heat exchanger disposed parallel to said engine, a cooling jacket for said engine, said cooling jacket having an outlet opening formed in one side thereof and between its ends and an inlet opening disposed contiguous to said outlet opening, a water pump driven by said engine and having an outlet port in communication with said cylinder block inlet opening for circulating coolant through said engine and through said heat exchanger, and a thermostat assembly for controlling the communication of one of said engine cooling jacket openings with said heat exchanger, said thermostat assembly including a pipe discharge extending perpendicular to the engine and between said inlet opening and said outlet opening and in communication with the heat exchanger.

27. A cooling system as set forth in claim 26 wherein the one engine cooling jacket opening controlled by the thermostat comprises the outlet opening.

28. A cooling system as set forth in claim 26 wherein the pipe forms a portion of housing assembly for the thermostat.

29. A cooling system as set forth in claim 28 wherein the thermostat assembly is adjacent the water pump and forms a portion of the water pump housing.

30. A cooling system as set forth in claim 29 wherein the engine cooling jacket comprises a cylinder head cooling jacket and a cylinder block cooling jacket.

31. A cooling system as set forth in claim 30 wherein coolant is delivered first to the cylinder head cooling jacket and subsequently to the cylinder block cooling jacket.

32. A cooling system as set forth in claim 31 wherein coolant is delivered from the water pump to the cylinder head cooling jacket through a passage formed in the cylinder block and independent of the cylinder block cooling jacket.

33. In an internal combustion engine having a cooling jacket and a cylinder head mounting at least one overhead mounted camshaft for operating the valves in said cylinder head, an output shaft driven by said engine, timing means for driving said camshaft from said engine output shaft comprising a first flexible transmitter for driving a cam driving shaft journaled by the engine and a second flexible transmitter for driving said camshaft from said cam driving shaft, a coolant pump, and means for driving said coolant pump from one of said flexible transmitters.

34. In an internal combustion engine as set forth in claim 33 wherein the coolant pump includes an idler sprocket engaged with the first flexible transmitter for driving the coolant pump.

35. A cooling arrangement for the cylinder head of an internal combustion engine, said cylinder head having ends and opposing sides, said cylinder head further having a lower surface forming a closure of a cylinder bore and defining at least in part a combustion chamber for said engine, an intake passage extending through one side of said cylinder head and terminating at least one intake port formed in said lower surface on one side thereof, an exhaust passage extending from at least one exhaust port formed in said lower surface on the other side thereof through the other side of said cylinder head, said cylinder head lower surface being formed with a central portion extending between said intake and exhaust ports, a cooling jacket formed in said cylinder head extending at least in part around said intake and exhaust passages and said lower surface, a pair of spaced apart means for introducing liquid coolant to said cylinder head at least at one side of said cylinder head and each spaced toward a respective one end of said cylinder head from one of said passages for directing liquid coolant toward the respective corresponding side of the other of said passages for discharge from an outlet to establish a cross flow of coolant across said cylinder head, and a pair of flow directing means each extending into said cooling jacket for redirecting at least a portion of the coolant flow away from the respective end of said cylinder head toward each other and toward said central portion.

36. A cooling arrangement as set forth in claim 35 wherein there are a pair of walls formed in the cooling jacket on the opposite sides of the central surface with the flow directing means being formed by projections of said walls.

37. A cooling arrangement as set forth in claim 36 wherein the projections are offset from the center of the cylinder toward the side from which the flow exits.

38. A cooling arrangement as set forth in claim 37 wherein the cylinder head has coolant inlet port means on the intake side of the head and outlet port means on the exhaust side of the head.

39. A cooling arrangement as set forth in claim 38 wherein there are plural intake ports and plural exhaust ports.

40. A cooling arrangement as set forth in claim 39 wherein there are more intake ports than exhaust ports.

41. A cooling arrangement as set forth in claim 35 wherein the flow directing means comprises a pair of members extending vertically through the cooling jacket from the cylinder head lower surface to the cylinder head upper surface.

42. A cooling arrangement as set forth in claim 41 wherein the projections are offset from the center of the cylinder toward the side from which the flow exits.

43. A cooling system as set forth in claim 42 wherein the cylinder head has coolant inlet port means on the intake side of the head and outlet port means on the exhaust side of the head.

44. A cooling arrangement as set forth in claim 43 wherein there are plural intake ports and plural exhaust ports.

45. A cooling arrangement as set forth in claim 44 wherein there are more intake ports than exhaust ports.

46. A cooling system for an internal combustion engine having a cylinder block with a plurality of aligned cylinders, a cylinder head affixed to said cylinder block and closing said cylinders, a heat exchanger for said engine, said cylinder head and said cylinder block each having a respective cooling jacket, a centrifugal type water pump disposed between the ends of said engine for circulating coolant through said engine cooling jacket and through said heat exchanger, a thermostatic valve for controlling the flow between said engine cooling jacket and the heat exchanger positioned between the ends of said engine, and means for delivering coolant from said water pump to said cylinder head cooling jacket through a passage formed in said cylinder block independent from said cylinder block cooling jacket and subsequently from said cylinder head cooling jacket to said cylinder head block cooling jacket for return back to said water pump.

* * * * *

UNITED STATES PATENT AND TRADEMARK OFFICE
CERTIFICATE OF CORRECTION

PATENT NO. : 5,113,807
DATED : May 19, 1992
INVENTOR(S) : Manabu Kobayashi

It is certified that error appears in the above-identified patent and that said Letters Patent is hereby corrected as shown below:

Abstract line 11, "to" should be --of--.

Column 10, line 55, Claim 12, after "camshaft" insert --, a camshaft--.

Signed and Sealed this

Nineteenth Day of October, 1993

Attest:

BRUCE LEHMAN

Attesting Officer  Commissioner of Patents and Trademarks

REEXAMINATION CERTIFICATE (2414th)

United States Patent [19]
Kobayashi

[11] B1 5,113,807
[45] Certificate Issued  Oct. 25, 1994

[54] COOLING SYSTEM FOR ENGINE

[75] Inventor: Manabu Kobayashi, Shizuoka, Japan

[73] Assignee: Yamaha Hatsudoki Kabushiki Kaisha, Iwata, Japan

Reexamination Request:
No. 90/003,204, Sep. 22, 1993

Reexamination Certificate for:
Patent No.: 5,113,807
Issued: May 19, 1992
Appl. No.: 554,256
Filed: Jul. 17, 1990

Certificate of Correction issued Oct. 19, 1993.

[30] Foreign Application Priority Data

Jul. 19, 1989 [JP] Japan .................. 1-186614
Jul. 19, 1989 [JP] Japan .................. 1-186616

[51] Int. Cl.$^5$ ............................. F02B 75/18
[52] U.S. Cl. ................. 123/41.74; 123/41.44; 123/90.31; 123/198 C
[58] Field of Search ............. 123/41.08, 41.09, 41.10, 123/41.44, 41.72, 41.74, 41.82 R, 90.27, 90.31, 195 A, 198 R, 198 C

[56] References Cited

U.S. PATENT DOCUMENTS 1,877,051 9/1932 Read .................. 123/41.82 R
4,750,455 6/1988 Ebeso ................. 123/90.31

FOREIGN PATENT DOCUMENTS 803449 4/1951 Fed. Rep. of Germany .
3510148 6/1986 Fed. Rep. of Germany ... 123/198 C
3807458 9/1988 Fed. Rep. of Germany ...... 180/297
2060772 5/1981 United Kingdom .
2134594 8/1984 United Kingdom .

*Primary Examiner*—Noah Kamen

[57] ABSTRACT

A transversely disposed water cooled internal combustion engine for a motor vehicle that cooperates with a heat exchanger that is disposed transversely to the engine compartment and in parallel relationship with the engine. A cooling pump and thermostat assembly is mounted on the side of the engine between its ends and facing the heat exchanger for communicating the heat exchanger with the engine cooling jacket. Coolant is delivered first to the cylinder head and then through the cylinder head to the cylinder block cooling jacket. The coolant pump is driven off of an intermediate shaft driven by the timing mechanism for driving the camshafts of the engine.

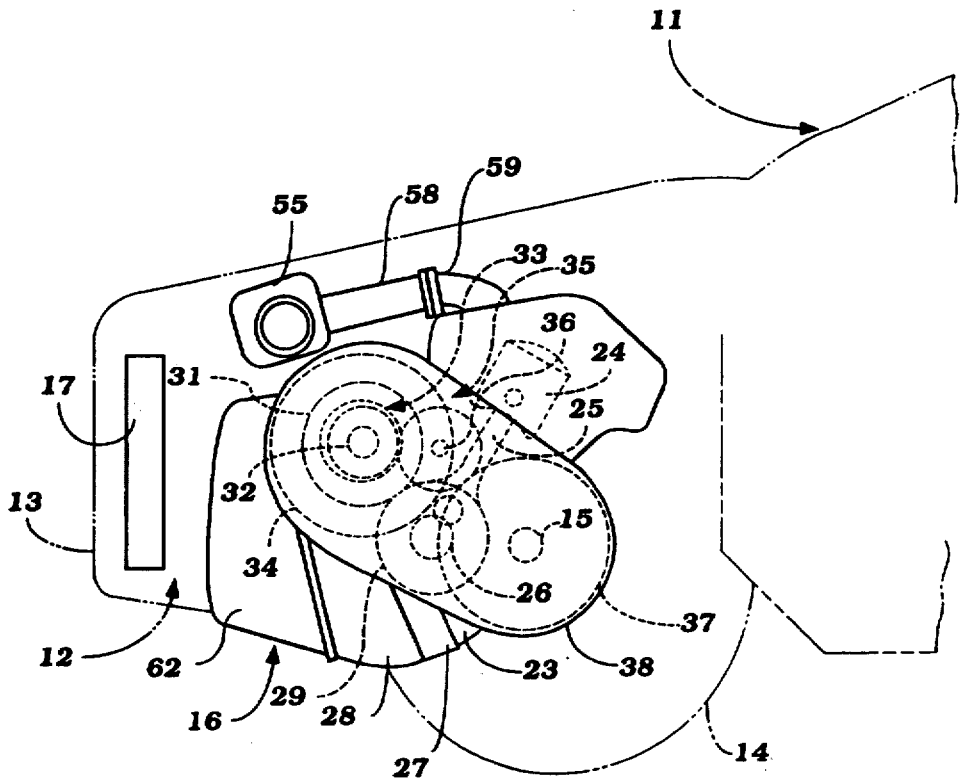

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 12-32 and 35-45 is confirmed.

Claims 1, 8, 10, 33 and 46 are determined to be patentable as amended.

Claims 2-7, 9, 11, and 34 dependent on an amended claim, are determined to be patentable.

1. A cooling system for an internal combustion engine having a plurality of aligned cylinders, a heat exchanger disposed parallel to and on one side of said engine, a cooling jacket for said engine, a centrifugal type water pump disposed between the cylinders at the ends of said engine and on the side of said engine adjacent said heat exchanger for circulating coolant through said engine cooling jacket and through said heat exchanger, *said water pump communicating with an engine cooling jacket inlet opening formed contiguous to said water pump and between said end cylinders,* said coolant pump including a coolant pump drive shaft rotating about an axis parallel to the heat exchanger, and a thermostatic valve *having a thermostat housing* for controlling the flow between *a water outlet opening in* said engine cooling jacket *disposed between said end cylinders* and the heat exchanger, positioned on the side of said engine adjacent said water pump and between the cylinders at the ends of said engine.

4. A cooling system as set forth in claim 3 wherein the thermostat housing further forms a water outlet portion communicating with [a water] *the water* outlet opening [formed] in the engine *cooling jacket.*

8. A cooling system as set forth in claim 7 wherein coolant is delivered from the water pump to the cylinder head cooling jacket through a passage formed in the cylinder block *extending from the inlet opening* and independent of the cylinder block cooling jacket.

10. A cooling system as set forth in claim 9 wherein coolant is delivered from the water pump to the cylinder head cooling jacket through a passage formed in the cylinder block *extending from the inlet opening* and independent of the cylinder block cooling jacket.

33. In an internal combustion engine having a *cylinder block having a* cooling jacket and a *connected cylinder head having a cooling jacket* mounting at least one overhead mounted camshaft for operating the valves in said cylinder head, an output shaft driven by said engine, timing means for driving said camshaft from said engine output shaft comprising a first flexible transmitter for driving a cam driving shaft journaled by the engine *contiguous to said cylinder head* and a second flexible transmitter for driving said camshaft from said cam driving shaft, a coolant pump[.] *for delivering coolant to said engine through said cylinder head cooling jacket before said cylinder block cooling jacket and juxtaposed to said cylinder head* and means for driving said coolant pump from one of said flexible transmitters *contiguous to said cam driving shaft.*

46. A cooling system for an internal combustion engine having a cylinder block with a plurality of aligned cylinders, a cylinder head affixed to said cylinder block and closing said cylinders, a heat exchanger for said engine, said cylinder head and said cylinder block each having a respective cooling jacket, a centrifugal type water pump disposed between the ends of said engine for circulating coolant through said engine cooling jacket and through said heat exchanger, a thermostatic valve for controlling the flow between said engine cooling jacket and the heat exchanger positioned between the ends of said engine, and means for delivering coolant from said water pump to said cylinder head cooling jacket through a passage formed in said cylinder block independent from said cylinder block cooling jacket and subsequently from said cylinder head cooling jacket *adjacent said water pump and between the ends of said engine* to said cylinder [head] block cooling jacket for return *from an outlet adjacent said water pump between the ends of said engine* back to said water pump.

* * * * *